United States Patent Office 3,098,717,
Patented July 23, 1963

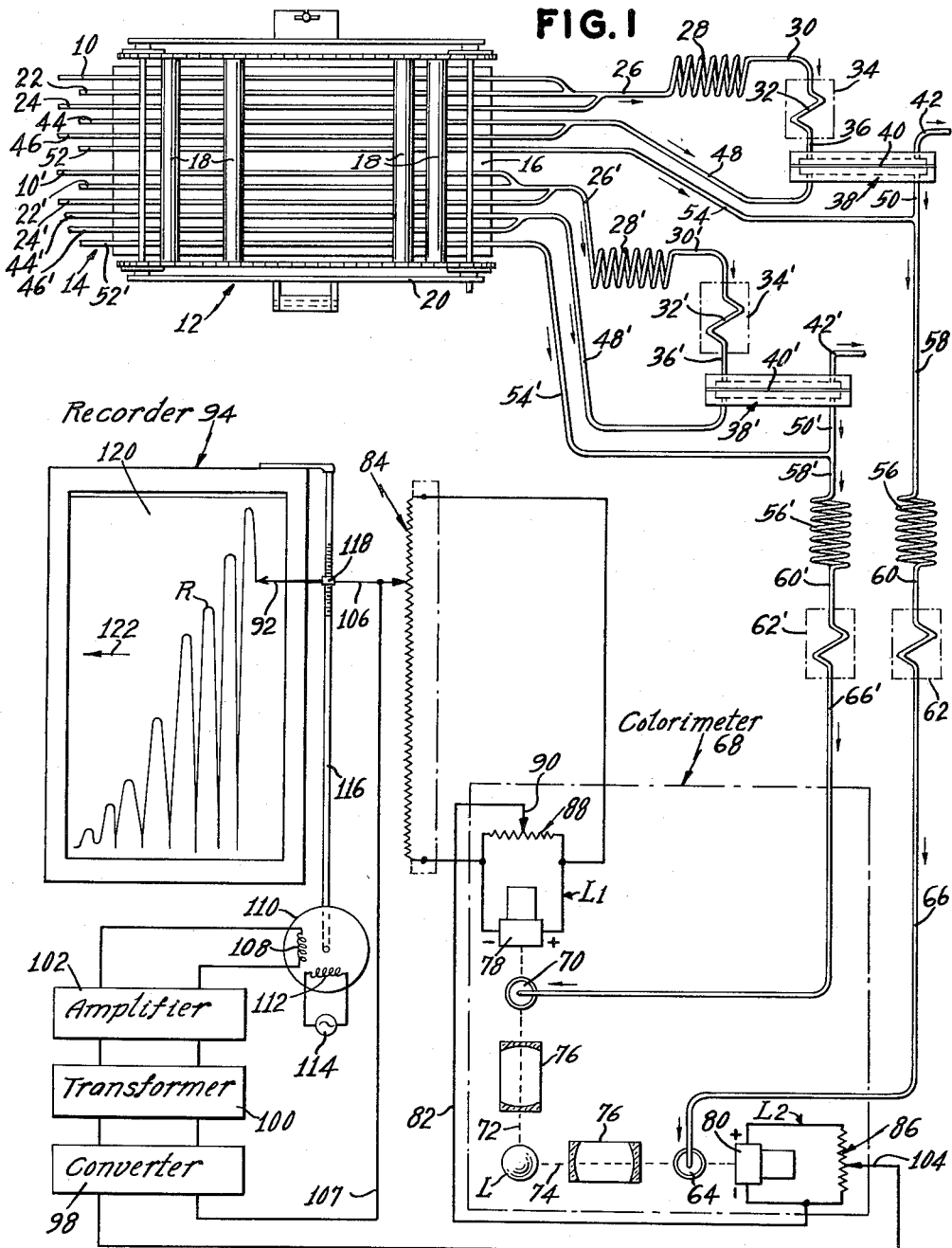

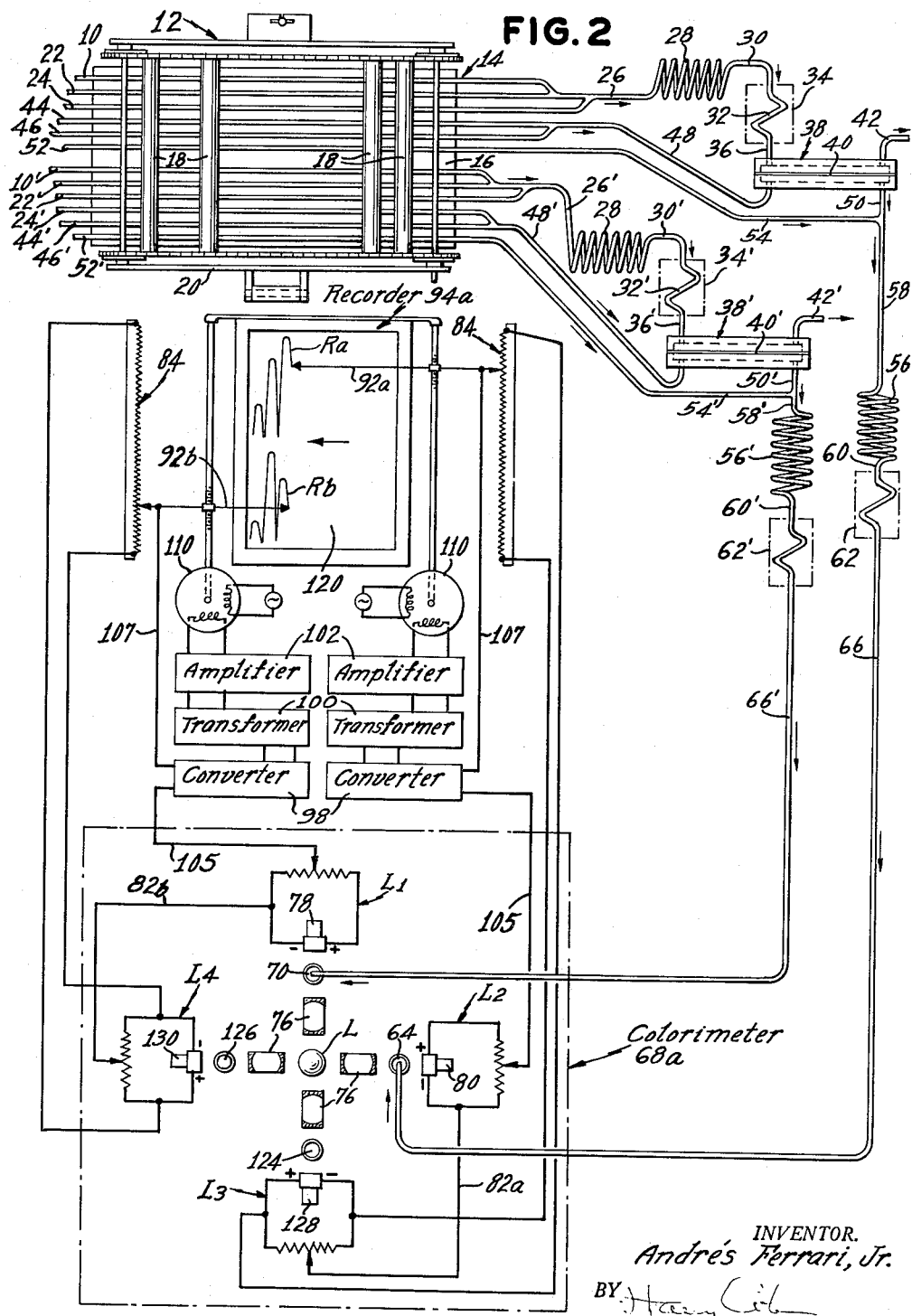

3,098,717
FLUID TREATMENT METHOD AND APPARATUS
WITH DOUBLE-FLOW COLORIMETER
Andres Ferrari, Jr., Scarsdale, N.Y., assignor to Technicon
Instruments Corporation, Chauncey, N.Y., a corporation of New York
Filed Apr. 27, 1959, Ser. No. 809,303
5 Claims. (Cl. 23—230)

This invention relates to a method and apparatus or systems for automatic quantitative analysis, monitoring, process controls, etc., of various fluids in respect to a constituent thereof.

One object of the present invention is the provision of apparatus and a method for the continuous treatment of fluids wherein samples of the fluids are simultaneously processed for determining the quantity of a constituent thereof.

Another object of the present invention is the provision of fluid treatment apparatus having colorimetric means for determining the quantity of a constituent of a fluid without interference due to the varying colors of the fluid at its source.

A further object of the present invention is to provide a fluid treatment apparatus for processing a fluid for simultaneously determining the quantity of at least two constituents thereof.

A still further object of the invention is to provide an improved colorimeter having provision for continuously analyzing two samples of a fluid simultaneously.

The above and other objects, features and advantages of the present invention will be more fully understood from the following description considered in connection with the accompanying illustrative drawings.

In the drawings:

FIG. 1 is a more or less diagrammatic view of an apparatus embodying the present invention for processing a fluid for determining the quantity of a substance in said fluid for analysis, monitoring, etc.; and FIG. 2 is a more or less diagrammatic view of an apparatus pursuant to another embodiment of the present invention for processing a fluid for determining the quantities of at least two substances therein.

In accordance with the present invention, briefly described, two identical samples of a fluid with respect to which the quantity of a constituent thereof is to be determined, are caused to flow in the form of separate streams to identical treatment apparatus. In the apparatus, each sample of fluid is treated with processing reagents in accordance with the constituent thereof to be determined, and one of said samples is treated with a color-producing reagent which reacts with the constituent in the sample to produce a color indicative of the quantity of said constituent thereof. The other sample of fluid is identically treated with the same processing reagents but in lieu of the color-producing reagent an inert colorless fluid, such as distilled water, is substituted so that no color is produced indicating the quantity of the constituent thereof, as was done with the first mentioned sample. Both samples are then simultaneously transmitted to a double flow colorimeter having separate flow cuvettes or cells for the two samples, respectively. The light transmission through the samples in their respective flow cuvettes are compared and the difference therebetween is measured by a photo-electric device which operates a recorder to indicate the quantity of the constituent in the fluid, the difference between the light transmission of the samples in each of their respective flow cuvettes being indicative of the quantity of the constituent thereof. It will be apparent that since each sample of fluid is compared to the other, any color variations in the broth or medium from which the samples are derived will occur in both samples, and accordingly will not affect or vary the colorimetric measurements.

In accordance with another embodiment of the invention, the double flow colorimeter is provided with a colorless standard or reference medium for each of the flow cuvettes therein and the apparatus is provided with means for the simultaneous treatment of at least two samples of the same fluid for determining the quantity of at least two constituents thereof. Each sample of the fluid is simultaneously treated with respect to a different constituent thereof and each of the treated samples is transmitted to their respective flow cuvettes in the double flow colorimeter wherein both samples are simultaneously colorimetrically analyzed with respect to a constituent thereof. Separate photo-electric devices are provided for measuring the difference between the light transmitted through a sample and a reference medium therefor and the results of the measurement are simultaneously recorded to indicate the quantities of the two constituents of the fluid.

Referring now to the drawings in detail, and particularly to FIG. 1, a sample fluid to be analyzed or treated is supplied from a source, not shown, to a tubular conduit or pump tube 10 and is caused to flow therethrough by a proportioning pump indicated diagrammatically at 12. Said proportioning pump is preferably of the type disclosed and claimed in United States application, Serial No. 628,030, filed December 13, 1956, by Jack Isreeli and me, as joint inventors, now Patent No. 2,893,324. Briefly described, said pump comprises a plurality of resilient flexible tubes, generally indicated by reference numeral 14, which are simultaneously and progressively compressed along their lengths against a platen 16 by a plurality of pressure rollers 18, carried by an endless conveyor 20, and moved by the latter longitudinally of said tubes to pump proportional quantities of fluids therethrough, depending upon the internal diameter or lumens, respectively, of said tubes and the linear speed of said rollers longitudinally of the tubes. The tubes have internal diameters which may be the same or different, according to the required metering of the fluids pumped therethrough, respectively, but have the same wall thickness in order that they may be fully compressed simultaneously by the pressure rollers irrespective of the internal diameters of the tubes.

The fluid sample flowing in pump tube 10 may be divided into alternate segments of liquid and gas by the introduction of air or other inert gas through pump tube 22, as described in the United States patent to Skeggs, No. 2,797,149. As described in said patent, the division of the fluid sample stream into small flowing segments of liquid separated by intervening flowing segments of an inert gas or air is effective to prevent particles of the liquid or substances therein from adhering to the inner walls of the tubes of the apparatus by wiping said walls during the flow thereof in said tubes, thereby preventing contamination of one liquid segment by the other. It will be understood that the fluid sample may be derived from a conduit or apparatus in an industrial plant as a continuous flowing stream or a series of separate or individual quantities of said fluid sample may be supplied automatically in succession to pump tube 10 by suitable apparatus, preferably the apparatus of the type disclosed in the United States application of Jack Isreeli, Serial No. 666,403, filed June 18, 1957, now Patent No. 3,038,348. In the latter case, the individual quantities of liquid samples will be separated from each other by an air segment.

A suitable processing fluid or reagent is supplied to pump tube 24 and joins the sub-divided or segmentized fluid sample stream flowing in conduit 26, which is in fluid communication with the horizontal helical mixing coil 28, which is preferably made of glass, for the mixing therein of the fluid sample and the reagent. The mixed fluids then flow from the mixing coil 28, via conduit 30, through a coil 32, immersed in a heating bath, indicated at 34, and from said heating bath, via conduit 36, through a tubular passage of a dialyzer 38, at the upper side of the dialyzer membrane thereof indicated at 40, and then to the outlet conduit 42 for the discharge thereof.

Simultaneously with the transmission of the segmented sample stream to the upper part of the dialyzer, a diffusate processing fluid or color-producing reagent is transmitted to said dialyzer at the other side of the membrane thereof. The processing fluid or color-producing reagent is supplied to pump tube 44, from a source not shown, and said reagent may be segmentized by introducing a stream of air or other inert gas through pump tube 46. The diffusate stream is transmitted to dialyzer 38, at the lower side of dialyzer membrane 40 thereof, via conduit 48, to receive at least a portion of the constituent or a reaction product thereof diffused through the dialyzer membrane as said diffusate liquid passes through the tubular passage at the lower side of the dialyzer. The dialyzer is preferably of the type shown and described in U.S. Patent No. 2,864,507. The dialyzer membrane 40 acts to hold back contaminants in the fluid being analyzed or treated and provides a convenient and advantageous means to diffuse at least a portion of the constituent contained in the fluid samples, the quantity of said diffused constituent being in proportion to the quantity thereof in the fluid sample.

The fluid stream containing at least a portion of the constituent of the fluid sample stream, or a reaction product thereof, is transmitted from dialyzer 38, via conduit 50, to join another stream of a processing fluid or reagent supplied to pump tube 52, from a source not shown, and caused to flow through conduit 54, by pump 12, to join the fluid stream flowing in conduit 50. The fluid stream containing processing fluids or reagents and a portion of the constituent or reaction product thereof, of the sample is transmitted to a horizontal helical mixing coil 56, via conduit 58, wherein the various substances contained in the flowing stream are thoroughly mixed, and then transmitted, via conduit 60, to a heating bath, indicated by reference numeral 62, wherein the color-producing reaction occurs producing a color indicative of the quantity of the constituent contained in the fluid sample being analyzed. From the heating bath the colored fluid stream is transmitted to a flow cuvette 64, via conduit 66, of a double flow colorimeter, indicated at 68, wherein the color of the fluid stream is measured.

Simultaneously with the transmission of the treated fluid sample to the flow cuvette 64, another identical sample is transmitted through identical treating apparatus to a flow cuvette 70 of the colorimeter. It will be understood that both samples of fluid are simultaneously introduced into their respective pump tubes 10 and 10' from a source which may be a flowing stream or an individual quantity of fluid. The pump tubes for the second fluid sample are part of pump 12, as shown, and are actuated by the pressure rollers 18 thereof. However, if desired, the pump tubes for the second sample may be part of a separate pump identical to the pump used for the first fluid sample. In the latter case, two separate but identical treating apparatus having separate pumps would be provided for each of the samples of fluid, it being understood that the pump tubes for the second sample are identical to the pump tubes for the first sample. The components of the treating apparatus for the second sample are shown as primed numerals to indicate their corresponding parts in the treating apparatus for the first sample. The processing fluids or reagents transmitted through the identical various pump tubes for the second sample are identical to the processing fluids or reagents transmitted through the corresponding pump tubes for the first sample, except that in lieu of the color-producing reagent introduced into pump tube 44 for the first sample, a colorless inert fluid, such as distilled water, is introduced into a similar pump tube 44' for the second sample so that no color reaction will take place in the treating apparatus for the second sample of fluid. Accordingly, since the light transmitted through each of the samples of fluid, in their respective flow cuvettes 64 and 70, is being compared in the double flow colorimeter 68, any variations in color that may occur in the broth or fluid medium from where the samples are taken has no effect on the light measurements being taken, said light measurements indicating only the density of the color produced as a result of the constituent of the fluid sample. Since the succeeding samples of fluid are always being colorimetrically compared to identical samples of fluid, varying colors in the samples of fluid due to varying colors of the broth or fluid medium from which they are taken and not due to the density of the color produced by the constituents thereof, have no effect on the colorimeter readings because the varying colors occur equally in each sample of fluid, and since the samples are being colorimetrically compared, the varying colors automatically are compensated for.

Double flow colorimeter 68 is provided with a single light source L from which light rays 72 and 74 are directed, by focusing lenses 76 through the respective flow cuvettes 70 and 64 to photo-electric devices 78 and 80, respectively. The photo-electric devices 78 and 80 are connected in circuit, in series opposition, it being noted that the photo-electric device 78 feeds into a loop L1 and the photo-electric device 80 feeds into a loop L2, and that said loops are interconnected, as by wire 82. The output of the device 78 is developed across the slide wire potentiometer 84, connected in the loop L1, and the output of the photo-electric device 80 is developed across a potentiometer 86 in the loop L2. Provision is made in the loop L1 for potentiometer 88 which functions as a range positioning or zero control upon movement of tap 90, for adjusting the range of movement of a stylus 92 of a recorder 94.

As is well known to those skilled in the art, the energization of each of the photo-electric devices 78 and 80 produced by impingement of light thereon, generates a current flow in the output loops L1 and L2, respectively. The current flow in the loop L2 produces a voltage drop across the potentiometer 86 and current flow in the loop L1 produces a voltage drop across the slide wire potentiometer 84. The voltage drops produced across said potentiometers, or portions thereof, are applied to a conventional balancing system. Said balancing system includes a converter stage 98, which is constituted preferably by a vibrating reed converter or chopper, to convert the direct current generated by the photo-electric devices to alternating current. The output from the converter is applied to a transformer 100 and then to an amplifier stage 102. The voltage difference between the tap 104 of potentiometer 86 and the tap 106 of the potentiometer 84 is applied to the converter 98, via leads 105 and 107, respectively. The output of the amplifier 102 is applied to one winding 108 of a two-phase motor 110, the other winding 112 thereof being energized by the A.C. source 114. The motor 110 operates in response to the voltage applied at the converter stage 98, to drive the tap 106 of the slide wire potentiometer 84, as indicated, by rotation of threaded shaft 116, which drives tap 106 and stylus 92 by movement of member 118 along said threaded shaft. Movement of tap 106 balances the system, at which point there is no potential difference applied to converter 98 and the motor 110 comes to rest.

The stylus 92 of recorder 94 records the movements of the tap 106 on a recording strip or chart 120 driven by a suitable mechanism, not shown, in the direction of arrow 122 to provide a record R on the chart of the recorder, the stylus 92 moving concomitantly with the tap 106 of potentiometer 84. The record made by the recorder is the difference between the light transmitted through the color reacted treated sample in flow cuvette 64 and the light transmitted through the non-color reacted treated sample in flow cuvette 70, this difference indicating the quantity of the constituent of the sample with respect to which the sample was treated.

The apparatus shown in FIG. 1, is especially well adapted to determine the quantities of constituents of a fluid wherein the fluid from which the samples are taken varies in color, said variations in color being independent of the constituents of the fluid with respect to which the quantities thereof are to be determined. For example, in determining the quantity of total sugars in waste or sewer waters in sugar refineries the waste or sewer water samples are supplied to each of pump tubes 10 and 10′, respectively, and a 2 N solution of sulfuric acid is supplied to each of pump tubes 24 and 24′, each of pump tubes 22 and 22′ being used to transmit a flowing stream of air or other inert gas for segmentizing or dividing the sewer water samples flowing in their respective pump tubes 10 and 10′. The sewer water samples and solutions of sulfuric acid are mixed in mixing coils 28 and 28′, respectively, and heated in heating baths 34 and 34′, preferably operated at a temperature of 95° C. wherein, in said heating baths, each of the fluid samples are hydrolized to invert the non-reducing sugars contained in the sewer water samples to reducing sugars, the treatment of the sewer water samples being for the determination of the total quantities of sugars contained therein. The hydrolized, segmentized samples of fluid are each transmitted from their respective heating baths, via conduits 36 and 36′, to the tubular passages of dialyzers 38 and 38′, at the upper side of the dialyzer membranes therein indicated at 40 and 40′, wherein at least a portion of the total sugars in the sample streams will diffuse through said dialyzer membranes into the diffusate liquids flowing through the tubular passages of the dialyzers at the lower side of the dialyzer membranes. From said dialyzers 38 and 38′, the undiffused fluid samples are discharged through conduits 42 and 42′, respectively.

The diffusate liquid for one of the samples of waste water consists of a segmentized stream of an alkaline solution of potassium ferricyanide ($K_3Fe(CN)_6$) which is transmitted through pump tube 44, from a source not shown, the insert gas or air being transmitted through pump tube 46, said potassium ferricyanide and gas joining each other and being transmitted, via conduit 48, to the tubular passage of the dialyzer at the lower side of the membrane thereof, wherein said diffusate liquid receives the diffused fluid sample containing the total sugars. The alkaline potassium ferricyanide solution consists of a mixture of 0.075 percent of potassium ferricyanide in water with a 2 N solution of sodium hydroxide (NaOH). The quantities of reagents employed are not critical and enough potassium ferricyanide should be used for reduction thereof to potassium ferrocyanide by all of the sugars contained in the sewer water under analysis. Other alkalies, besides sodium hydroxide, may be used for alkalizing the potassium ferricyanide and, for hydrolizing the sewer water samples containing sugars, other acids may be used besides sulfuric acid.

The alkaline potassium ferricyanide solution which acts as a diffusate liquid for one of the samples of fluid is the color-producing reagent previously referred to above. Accordingly, for the other fluid sample of sewer water, in lieu of the potassium ferricyanide solution supplied to pump tube 44, there is supplied to pump tube 44′ for said second sample of fluid, an insert colorless fluid, as distilled water, which acts as a diffusate liquid into which at least a portion of the total sugars in the other fluid sample diffuses, in the identical manner as described with respect to the said one fluid sample. Since no potassium ferricyanide solution is mixed with the other fluid sample, it will be apparent that no color reaction will occur in said other fluid sample indicative of the quantity of sugars in said sample.

To assist and promote the reaction between the sugars and the color-producing potassium ferricyanide solution, a catalyst is supplied through pump tube 52, said catalyst being a solution of potassium cyanide (KCN) and is transmitted through conduit 54 to join the segmented diffusate stream flowing in conduit 50 containing the alkaline potassium ferricyanide solution and the diffused sugars. Similarly, a solution of potassium cyanide (KCN) is supplied to pump tube 52′ for the other sample of fluid, it being understood that the treating apparatus and the processing fluids or reagents for each of said samples are identical with the exception of substituting a colorless inert fluid for the color-producing reagent for one of the samples of fluid.

The segmented fluid stream for the one sample containing the color-producing reagent, namely potassium ferricyanide, and the catalyst, namely potassium cyanide, are thoroughly mixed with the sugars in the fluid stream in helical coil 56. Similarly, with the other sample of fluid, the segmented fluid stream is transmitted to its respective mixing coil 56′, wherein the potassium cyanide, the distilled water, and the sugars in said stream are throughly mixed. The mixed fluid stream is transmitted, via conduit 60, to the heating bath 62 wherein the color-producing reaction for the one sample fluid takes place, the other sample fluid undergoing no color-producing reaction since no color-producing reagent was mixed with said sample.

The color-producing reaction involves the reduction of the potassium ferricyanide to potassium ferrocyanide, by the sugars contained in the sewer water sample, the potassium ferricyanide being yellow in color and the potassium ferrocyanide being colorless, the amount of the color change being proportional to the quantities of the sugars contained in the sewer waters. From their respective heating baths the color reacted sample of fluid is transmitted to its respective flow curvette 64, via conduit 66, and the non-color reacted fluid sample is transmitted to its respective flow cuvette 70, wherein the color change due to the quantity of the sugars contained in the color reacted sample is measured in the double flow colorimeter 68, and the results of said measurements are recorded by the recorder 94, as previously described.

The following is a preferred but non-limitative example in respect to the proportions of fluids supplied by proportioning pump 12 to determine the quantities of sugars contained in sewer or waste waters. The sewer or waste to be analyzed or treated with respect to the sugars contained therein is pumped through pump tubes 10 and 10′ at the rate of 2.5 ml. per minute; the air is pumped through pump tubes 22 and 22′, respectively, at the rate of 4 ml. per minute; the sulfuric acid is pumped through pump tubes 24 and 24′, respectively, at the rate of 0.8 per minute; the alkaline potassium ferricyanide solution is pumped through pump tube 44 at the rate of 1.6 ml. per minute; the distilled water is pumped through pump tube 44' at the rate of 1.6 ml. per minute; the air is pumped through pump tubes 46 and 46', respectively, at the rate of 2.5 ml. per minute; and the potassium cyanide is pumped through pump tubes 52 and 52', respectively, at the rate of 0.8 ml. per minute.

This apparatus is also especially well adapted for the quantitative analysis of a broth in respect to an anti-biotic substance contained therein, such as tetracycline or chlorotetra cycline, wherein varying colors may be found in the broth. The treatment of such a broth for the determination of the quantity of an anti-biotic substance contained therein is described in my co-pending application Serial No. 799,884, filed March 17, 1959.

Referring now to FIG. 2, there is shown apparatus similar to FIG. 1 that may be employed for simultaneously determining at least two constituents in a fluid such as, for example, total sugars and reducing sugars in waste or sewer waters in sugar refineries. After said determination, the difference between the total sugars and the reducing sugars may be readily calculated to determine the non-reducing sugars in the waste or sewer waters. It will be understood that the example of sugar determination in sewer waters is for illustrative purposes only and the quantities of at least two substances contained in other fluids may be simultaneously determined in accordance with the principles of this invention.

The apparatus shown in FIG. 2 is similar to the apparatus shown in FIG. 1 in that two separate and independent processing systems or treatment apparatus are furnished for simultaneously treating identical individual samples of the waste or sewer waters. However, two separate and independent measuring devices, each identical to the measuring device shown and described with reference to FIG. 1, are provided for simultaneously measuring and recording the quantity of each constituent in the fluid sample being analyzed. In this respect, the previously mentioned double flow colorimeter 68 has been modified so that the colorimeter 68a is provided with colorless blanks or solutions, said blanks or solutions acting as standards or reference mediums 124 and 126, respectively, for each of the flow cuvettes 64 and 70. Each of the reference mediums 124 and 126 is provided with focusing lenses 76 for focusing the light, from the light source L, onto the respective photo-electric devices 128 and 130. The previously mentioned photo-electric device 80 for the flow cuvette 64 and the photo-electric device 128 for the reference medium 124 are connected in circuit in series opposition, it being noted that the photo-electric device 128 feeds into a loop L3 and the photo-electric device 80 feeds into the loop L2, as previously described, and that said loops are interconnected, as by wire 82a. Similarly, the previously mentioned photo-electric device 78 for the flow cuvette 70 feeds into a loop L1 and the photo-electric device 130 for the reference medium 126 feeds into a loop L4, and that said loops are interconnected, as by wire 82b. In exactly the same manner as previously described with reference to FIG. 1, the outputs of photo-electric devices 80 and 128 are recorded on recorder 94a, the stylus 92a moving in accordance with the difference in the voltage outputs of said photo-electric devices to produce the record Ra on the upper part of the chart 120. Similarly, the outputs of the photo-electric devices 78 and 130 are recorded on recorder 94a, the movement of stylus 92b therefor being in accordance with the difference in the voltage output of said photo-electric devices to produce the record Rb on the lower part of the chart 120. It will be noted that each stylus 92a and 92b, respectively, simultaneously prints on the chart 120 of the recorder to simultaneously indicate on said chart quantities of two constituents of the fluid being analyzed, such as total sugars and reducing sugars which may be found in waste or sewer waters. It will be apparent that the difference of the readings of said recordings will indicate the quantity of non-reducing sugars in the sewer or waste waters. It will also be apparent that separate recorders may be provided for each stylus wherein each stylus will simultaneously record a graph on a separate chart.

As similarly described with respect to FIG. 1, identical samples of fluid are supplied to each of pump tubes 10 and 10', respectively, and identical processing fluids or reagents are supplied to their respective pump tubes, as previously described, except that for one of the samples of the fluid, distilled water or other inert colorless fluid is supplied to its respective pump tube 22' in lieu of sulfuric acid, so that said one sample will not be hydrolized to invert the non-reducing sugars, such as sucrose, contained in said one sample to reducing sugars. However, contrary to what was described with respect to FIG. 1, each of the samples is similarly treated with an alkaline solution of potassium ferricyanide which is supplied to each of the samples through their respective pump tubes 44 or 44'. Accordingly, the color produced by the reaction of the alkaline potassium ferricyanide solutions with the sugars contained in the fluid samples will produce a color indicative of the quantity of the total sugars contained in the fluid sample, that was hydrolized with sulfuric acid, and will produce a color indicative of the quantity of reducing sugars contained in the other sample fluid, which was not hydrolized.

After treatment, one of the fluid samples, such as for example, the hydrolized fluid sample, is transmitted to flow cuvette 64 and the other non-hydrolized fluid sample is transmitted to flow cuvette 70 of the double flow colorimeter 68a wherein the density of the color of each simple is measured to indiacte the quantities of the total sugars and reducing sugars contained in each sample, respectively. The results of these measurements are simultaneously recorded on recorder 94a for simultaneously determining the quantities of said constituents in said fluid sample.

While FIG. 2 indicates the same treatment apparatus for each sample of fluid, it will be understood that the treatment apparatus and processing fluids or reagents may be different for each sample of fluid depending upon the constituents for which the fluid is to be analyzed.

The flow cuvettes and the means including reflectors 76 for transmitting the light from the light source to the cuvettes and/or to the standard are preferably of the construction described in the application of Jack Isreeli, Serial No. 663,681, filed June 5, 1957, now Patent No. 2,999,417.

While I have shown and described the preferred embodiments of my invention, it will be understood that the invention may be embodied otherwise than as herein specifically illustrated or described, and that in the illustrated embodiment certain changes in the details of construction and in the form and arrangement of parts may be made without departing from the underlying idea or principles of this invention within the scope of the appended claims.

Having thus described my invention, what I claim and desire to secure by Letters Patent is:

1. A method of continuous colorimetric analysis, comprising providing a colorimeter having a flow cell for the flow therethrough of a fluid stream and having another flow cell for the flow therethrough of another fluid stream concurrently with the flow of said first mentioned stream, simultaneously forming separate streams of a fluid which is to be colorimetrically examined with respect to a constituent thereof, simultaneously and separately transmitting said streams to said colorimeter, dialyzing one of said streams during its flow to form a dialyzate stream and introducing into said dialyzate stream during its flow a fluid stream containing a color-producing reagent, dialyzing the other of said streams concurrently with the dialysis of said one stream during the flow of said other stream to form another dialyzate stream, introducing into said other dialyzate stream, concurrently with the introduction of said color-producing reagent into said first mentioned dialyzate stream, a stream of fluid containing a colorless non-reacting fluid in lieu of said color-producing reagent, introducing one of said treated dialyzate streams into one of said flow cells of the colorimeter and simultaneously introducing the other of said treated dialyzate streams into the other of said flow cells, and simultaneously comparing the light transmittance characteristics of said streams as they flow through their respective flow cells.

2. Continuous colorimetric analysis apparatus, comprising a conduit for the flow therethrough of one sample fluid stream, another conduit for the simultaneous flow therethrough of another and identical sample fluid stream as a comparison stream for said one sample stream, a colorimeter having a flow cell for the flow therethrough of said one sample stream to determine the quantity of a constituent present in said one sample stream during its flow through said cell, and having another flow cell for the flow therethrough of said comparison stream concurrently with the flow of said one sample stream for simultaneously comparing the light transmittance characteristics of said streams as they flow through their respective cells, said first mentioned conduit being in fluid flow communication with said flow cell for said one sample stream for transmitting the latter to said sample flow cell, said other conduit being in fluid flow communication with said flow cell for said comparison stream for transmitting the latter to said comparison flow cell, treatment means connected to said first mentioned conduit for said one sample stream and in the path of flow of the latter for the treatment thereof for colorimetric analysis before said one sample stream is introduced into said sample flow cell, and other treatment means identical to said first mentioned treatment means and connected to said other conduit for said comparison stream in the path of flow of the latter for the treatment thereof concurrently with the treatment of said one sample stream and before said comparison stream is introduced into said flow cell therefor, said first mentioned treatment means including conduit means to introduce a color-producing reagent into said one sample stream during its flow through said first mentioned conduit therefor, and said other treatment means including other conduit means identical to said first mentioned conduit means to introduce a colorless non-reacting fluid in lieu of said color-producing reagent into said comparison stream during its flow through said other conduit therefor, each of said treatment means including a mixing device for intermixing the fluids transmitted through said conduits, respectively, before they are introduced into the respective flow cells.

3. Continuous colorimetric analysis apparatus, comprising a conduit for the flow therethrough of one sample fluid stream, another conduit for the simultaneous flow therethrough of another and identical sample fluid stream as a comparison stream for said one sample stream, a colorimeter having a flow cell for the flow therethrough of said one sample stream to determine the quantity of a constituent present in said one sample stream during its flow through said cell, and having another flow cell for the flow therethrough of said comparison stream concurrently with the flow of said one sample stream for simultaneously comparing the light transmittance characteristics of said streams as they flow through their respective cells, said first mentioned conduit being in fluid flow communication with said flow cell for said one sample stream for transmitting the latter to said sample flow cell, said other conduit being in fluid flow communication with said flow cell for said comparison stream for transmitting the latter to said comparison flow cell, treatment means connected to said first mentioned conduit for said one sample stream and in the path of flow of the latter for the treatment thereof for colorimetric analysis before said one sample stream is introduced into said sample flow cell, and other treatment means identical to said first mentioned treatment means and connected to said other conduit for said comparison stream in the path of flow of the latter for the treatment thereof concurrently with the treatment of said one sample stream and before said comparison stream is introduced into said flow cell therefor, said first mentioned treatment means including a dialyzer, a mixing coil and conduit means to introduce a color-producing reagent into said one sample stream during its flow through said first mentioned conduit therefor, and said other treatment means including a dialyzer and a mixing coil, identical to said first mentioned dialyzer and mixing coil, and other conduit means identical to said first mentioned other conduit means to introduce a colorless non-reacting fluid in lieu of said color-producing reagent into said comparison stream during its flow through said other conduit therefor.

4. Continuous colorimetric analysis apparatus, comprising a colorimeter having a flow cell for the flow therethrough of a fluid stream to determine the quantity of a constituent present in said fluid stream during its flow through said cell, and having another flow cell for the flow therethrough of another fluid stream concurrently with the flow of said first mentioned fluid stream to determine a constituent of said other stream concurrently with the determination of said first mentioned constituent, said colorimeter having a single source of light only for simultaneous transmission of light from said source through each of said flow cells during the flow of said streams through their respective cells, a conduit in fluid flow communication with said first mentioned flow cell for transmitting said first mentioned stream thereto, another conduit in fluid flow communication with said other flow cell for transmitting said other fluid stream thereto concurrently with the flow of said first mentioned fluid stream to said first mentioned flow cell, treatment means connected to said first mentioned conduit and in the path of flow of said first mentioned fluid stream for the colorimetric treatment thereof with respect to said constituent of said first mentioned stream before the latter is introduced into said first mentioned flow cell, and other treatment means connected to said other conduit and in the path of flow of said other fluid stream for the colorimetric treatment thereof with respect to said constituent of said other stream concurrently with the treatment of said first mentioned stream and before said other stream is introduced into said other flow cell, and recorder means responsive to the light transmission through the fluids in each of said cells for simultaneously providing separate measurements of the quantities, respectively, of each of said constituents.

5. Continuous colorimetric analysis apparatus, comprising a colorimeter having a flow cell for the flow therethrough of a fluid stream to determine the quantity of a constituent present in said fluid stream during its flow through said cell, and having another flow cell for the flow therethrough of another fluid stream concurrently with the flow of said first mentioned fluid stream to determine a constituent of said other stream concurrently with the determination of said first mentioned constituent, said colorimeter having a single source of light only for simultaneous transmission of light from said source through each of said flow cells during the flow of said streams through their respective cells, a conduit in fluid flow communication with said first mentioned flow cell for transmitting said first mentioned stream thereto, another conduit in fluid flow communication with said other flow cell for transmitting said other fluid stream thereto concurrently with the flow of said first mentioned fluid stream to said first mentioned flow cell, treatment means connected to said first mentioned conduit and in the path of flow of said first mentioned fluid stream for the colorimetric treatment thereof with respect to said constituent of said first mentioned stream before the latter is introduced into said first mentioned flow cell, and other treatment means connected to said other conduit and in the path of flow of said other fluid stream for the colorimetric treatment thereof with respect to said constituent of said other stream concurrently with the treatment of said first mentioned stream and before said other stream is introduced into said other flow cell, and recorder means responsive to the light transmission through the fluids in each of said cells for simultaneously providing separate measurements indicating the quantities, respectively, of each of said constituents, said recorder means comprising a movable chart and means for simultaneously and separately recording said measurements on said chart.

References Cited in the file of this patent

UNITED STATES PATENTS

| | | |
|---|---|---|
| 2,408,900 | Alston | Oct. 8, 1946 |
| 2,797,149 | Skeggs | June 25, 1957 |
| 2,899,280 | Whiteheat | Aug. 11, 1959 |
| 2,950,396 | Schneider | Aug. 23, 1960 |

OTHER REFERENCES

Snell: Colorimetric Meth. of Anal. (1948), 3rd ed., vol. I, pages 38 and 39. (Copy in Library.)

Sparkman: Anal. Chem., vol. 30, 1958, pp. 1190 to 1206. (Copy in Div. 59.)